Nov. 27, 1934.　　　　H. J. HOGUE　　　　1,982,054
METHOD AND APPARATUS FOR MAKING NUTS
Filed Feb. 6, 1934　　　2 Sheets-Sheet 1

Nov. 27, 1934.  H. J. HOGUE  1,982,054
METHOD AND APPARATUS FOR MAKING NUTS
Filed Feb. 6, 1934  2 Sheets-Sheet 2

INVENTOR:
HENRY J. HOGUE
Kwis Hudson & Kent
ATTORNEYS

Patented Nov. 27, 1934

1,982,054

UNITED STATES PATENT OFFICE 1,982,054

METHOD AND APPARATUS FOR MAKING NUTS

Henry J. Hogue, Lakewood, Ohio, assignor of one-third to Charles L. Wasmer and one-third to John C. Wasmer, Lakewood, Ohio Application February 6, 1934, Serial No. 709,985

3 Claims. (Cl. 10—86)

This invention relates to an improved method and apparatus for making nuts for bolts and has for its principal object the provision of improvements that will reduce the cost of manufacture without changing the quality of the product.

According to modern methods of manufacturing nuts, and particularly nuts for the smaller sizes of bolts, rod stock of rectangular cross-section is fed into an automatic machine in which the blanks are perforated, severed from the rod, chamfered, and trimmed in successive stages. Round rods, that is, rods of round cross-section, cost considerably less than rods of rectangular cross-section and my improved method and apparatus are for the purpose of manufacturing nuts from round stock so as to make a substantial saving in the cost of the material, and I am able to do this, by my improved method and apparatus, at no sacrifice in the speed of production or, in other words, by my improved method and apparatus I am able to manufacture nuts from round stock at the same rate of production as they are now made from rectangular stock. Rod stock of relatively small rectangular cross-section cost more per ton than stock of relatively large rectangular cross-section, and my invention contemplates also, the manufacture of small nuts directly from stock of larger rectangular cross-section than is now used for such small nuts.

In the accompanying drawings, one form of apparatus for practicing my invention is illustrated, and in these drawings, Figure 1 is a plan view of the apparatus;

Fig. 5 is a side elevation of a section of rod stock showing the different stages of its conversion from the initial round cross-section to the nut blank;

Figs. 6 to 9 are cross-sections of the stock taken on the lines 6—6, 7—7, and 9—9, respectively, of Fig. 5; and Fig. 10 is a side elevation of a finished unthreaded nut blank as produced by the apparatus illustrated.

Figure 1:
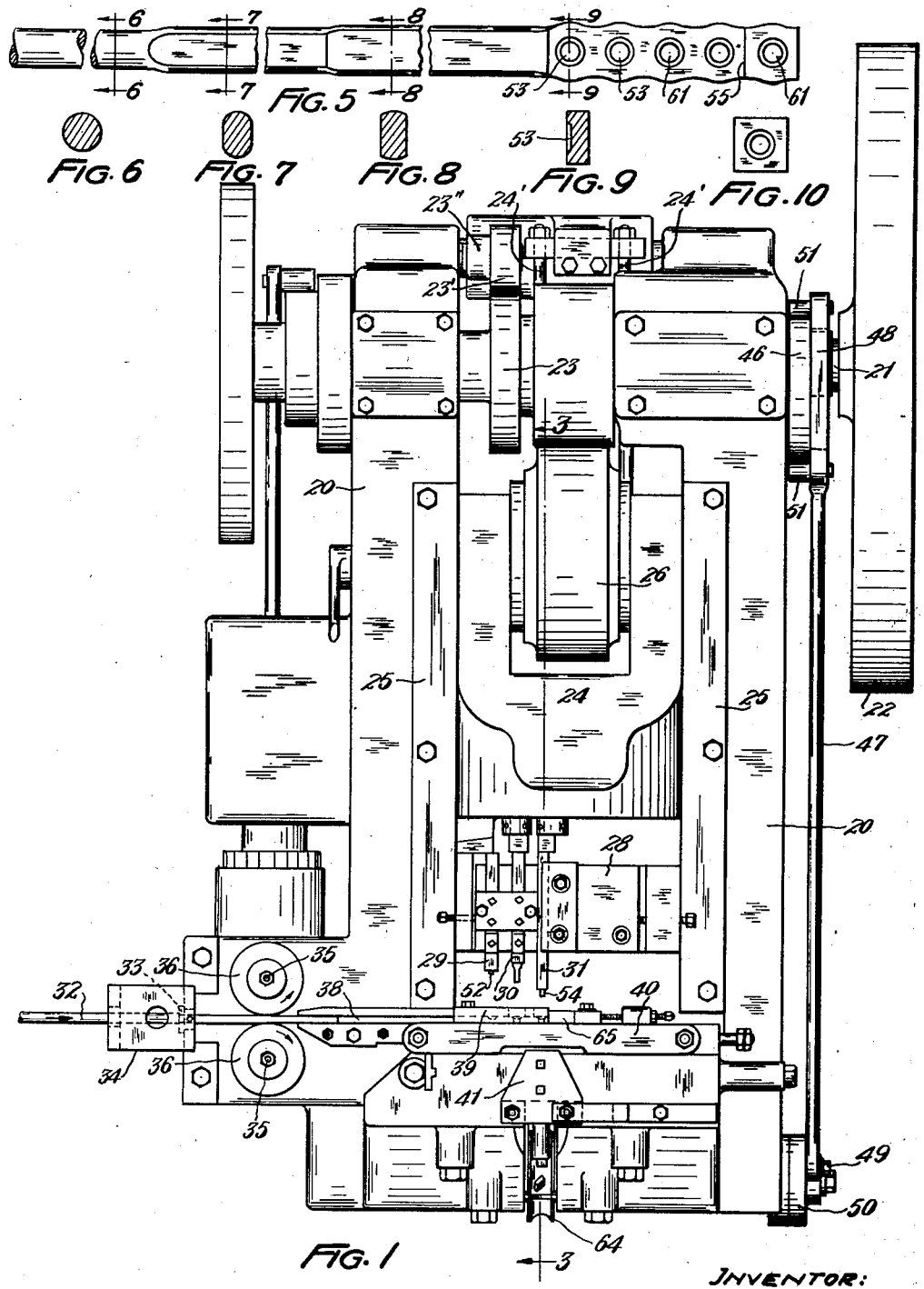
Figure 2:
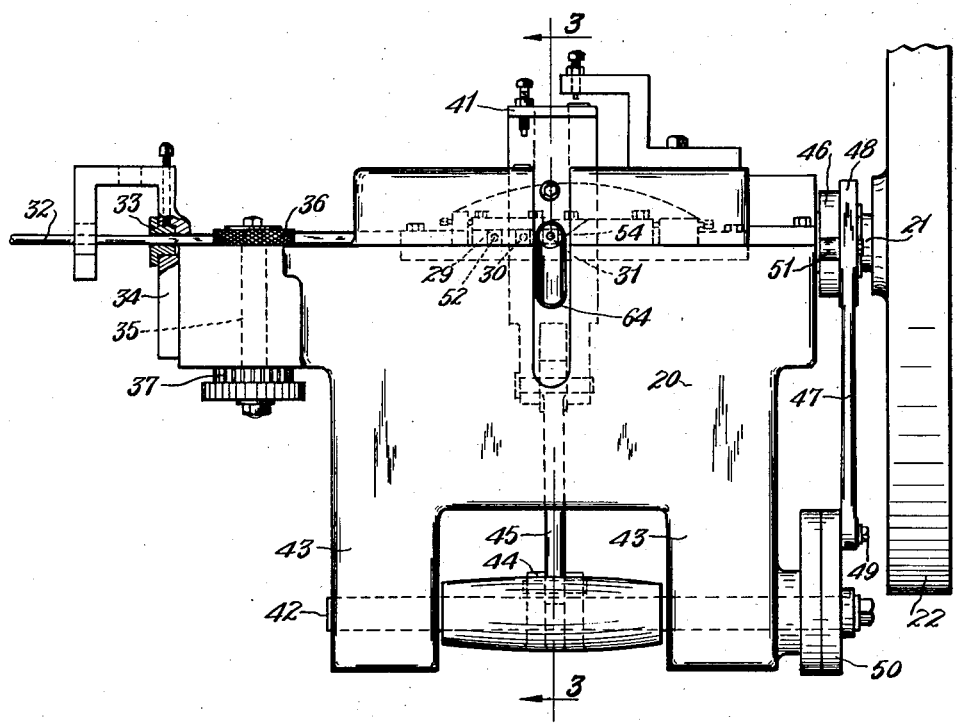
Fig. 2 is an end elevation thereof.

Referring to the drawings, 20 indicates the frame of the machine and 21 the main power shaft thereof on which the fly wheel 22 is mounted which may be in the form of a spur gear or belt pulley driven from an electric motor or other suitable source of power. A cross-head 24 is arranged for reciprocation in the guides or ways 25 on the frame of the machine. This cross-head carries a relatively large cam roller 26 which co-operates with the cam 27 that is fixed on the shaft 21 and rotates therewith. The cam 27 is suitably shaped to move the cross-head 24 forward to effect the operations hereinafter described, and the return movements of the cross-head are effected by means of a cam 23 with which a roller 23' cooperates. The roller 23' is mounted on the upper end of an oscillatable arm 23'' which is connected with the cross-head by means of the rods 24'. On an extension 28 of the cross-head there are a flattening punch 29, a piercing punch 30 and a blank-severing punch 31, these punches being securely clamped in position as shown. The round rod stock, entering the machine, is indicated at 32 in Fig. 1, and first passes through a drawing die 33 that changes the stock from the round to the substantially oval cross-section shown in Fig. 7. The drawing die 33 is mounted in a bracket 34 that is secured to the frame of the machine and, adjacent this bracket, the frame carries a pair of vertical shafts 35 on which the feeding and flattening rolls 36 are mounted. The shafts 35 are operatively connected by the gearing 37 and are intermittently rotated to feed the stock forward by suitable mechanism (not shown) which is actuated from the shaft 21 and which may be of the type that is commonly used in the well-known types of nut making machines.

From the feeding and flattening rolls 36 the stock passes into a guide slot 38 and through a stripper plate 39 which is provided with suitable openings for the punches 29, 30 and 31. The stripper plate is mounted on a die block 40 that is securely held on the frame of the machine and behind this die block and suitably guided is a vertically reciprocating head 41. A rocker shaft 42 is supported in suitable bearings in the legs 43 of the frame of the machine and carries a rocker arm 44 which is operatively connected with the head 41 by the connecting rod 45 so that the oscillation of the shaft 42 will effect the vertical reciprocation of the head 41. An eccentric cam 46 is secured on the shaft 21 and a connecting rod 47 having a yoke 48, arranged alongside the cam 46, is operatively connected at 49 with a crank disk 50 on the shaft 42. The yoke 48 carries rollers 51 on opposite sides of the cam 46 and cooperating with the latter so that, as the cam rotates, the connecting rod 47 is moved back and forth and effects the oscillation of the shaft 42.

The punch 29 is preferably provided with a small central projection 52 on its outer end and this projection forms a depression 53 in the stock when the punch 29 operates. After the stock passes the flattening and feeding rolls 36 its cross-sectional shape will be substantially as shown in Fig. 8. The stock is then subjected to a further flattening operation by the punch 29 which changes the cross-section of the stock to the form shown in Fig. 9. As previously stated, this flattening operation by the punch 29 is also accompanied by the formation of the depression 53 which, in the finished nut, serves as a countersink for facilitating the application of the nut to the bolt. Each feeding movement of the rolls 36 forces the stock forward a distance equal to the width of the nut across the flats and the punch 30 is spaced from the punch 29 the distance of two feeding movements, and the punch 30 operates on the stock to remove a slug therefrom and thereby form an opening through the nut for the reception of the tapping tool which is subsequently used to form the threads in the nut.

The punch 31 has an extension 54 on the end thereof and when this punch operates on the stock the extension 54 is arranged in the opening formed by the punch 30. The punch 31 is spaced from the punch 30 the distance of two feeding operations and shears the stock along a line 55 (see Fig. 5) to sever the blanks.

The head 41 carries a trimming die 56 and an anvil 57 which is arranged above the trimming die. The anvil 57 has a recess 58 in its operating face into which the severed blanks are forced by the punch 31 so as to chamfer the corners of one face of the nut. The trimming die 56 has an opening 59 therein in alignment with the punch 31 and the nut blank is forced through this opening to trim the sides of the nut to the finished dimensions.

Figure 3:
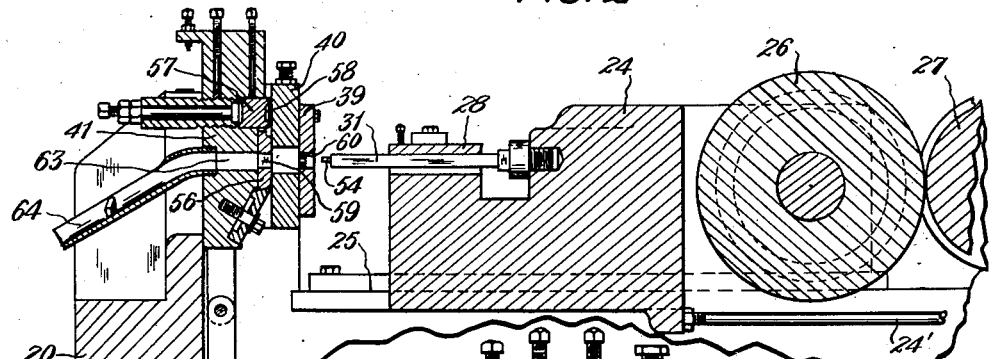
Fig. 3 is a section on the line 3—3 of Fig. 1.
Figure 4:
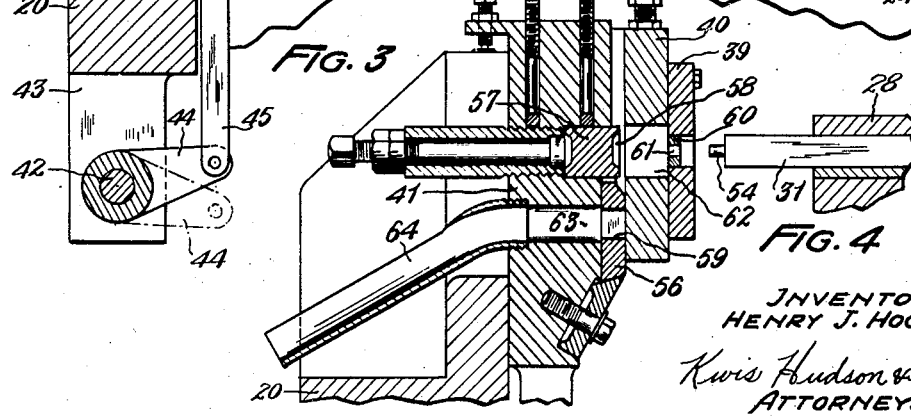
Fig. 4 is an enlargement of a portion of Fig. 3 with the parts shown in a different operating relation.

The operation of the mechanism just referred to for completing the nut blank, will be understood from Figs. 3 and 4. The stock, in these figures is indicated at 60 and, as the punch 31 approaches the stock, the projection 54 enters the opening 61 and then the punch severs the blank from the stock. The anvil 57 is positioned in line with the punch 31, as shown in Fig. 4, and the punch carries the blank against the anvil and forces the blank into the depression 58 to perform the chamfering operation. The cross-head 24 is then given a slight backward movement which withdraws the blank from the depression 58 and the blank is then momentarily held in the opening 62 of the die block 40. The head 41 is then moved upward, by the rock shaft 42, to the position shown in Fig. 3, and the punch 31 is then moved forward to force the blank through the opening in the trimming die 56 to perform the trimming operation. The blank then drops into the pocket 63 whence it is discharged through the chute 64. The cross-head 24 is then moved backward to restore the punch 31 to the position shown in Fig. 4.

Where I have used the term "rod stock" in the claims, I intend the term to refer to forms of stock that are commercially known as rods and bars.

It will be understood that the various parts of the mechanism operate in synchronism to perform the functions above described and that the punches 29, 30 and 31 perform their operations on different portions of the stock simultaneously. After the cross-head 24 has moved backward to restore the punches to the position shown in Fig. 1, the stock is again moved forward against a stop 65 and the punches will thereupon repeat the operations. When stock of rectangular cross-section is used instead of round stock it is only necessary to change the drawing die 33 to one having an opening adapted to draw down the stock to a smaller rectangular section. It will thus be seen that I have provided an improved method and apparatus by which round rods or rectangular bars may be converted into nut blanks, which are of squared or any other desired shape, by a continuous operation.

Having thus described my invention, I claim:

1. In nut-making apparatus, the combination with reciprocating mechanism for automatically piercing and severing nut blanks from continuous rod stock, of intermittently operating rolls for feeding and flattening the stock prior to the operation thereon of said mechanism, a reciprocating flattening punch carried by said mechanism for flattening the stock between said rolls and said piercing mechanism, said mechanism operating on the stock between the feeding movements thereof, and a drawing die through which the stock is drawn by said feeding means, said die being adapted to change said stock from a round to a substantially oval cross-section.

2. The hereindescribed method of making nut blanks which consists in intermittently moving a continuous round rod, drawing the stock to a substantially oval cross-section and then rolling the stock from the oval to a substantially rectangular cross-section, said drawing and rolling operations being performed on different sections of the stock simultaneously, and while the stock is in motion, and piercing the stock and severing blanks therefrom while stationary.

3. The hereindescribed method of making nut blanks which consists in intermittently moving a continuous round rod, drawing the stock to a substantially oval cross-section and then rolling the stock from the oval to a substantially rectangular cross-section, said drawing and rolling operations being performed on different sections of the stock simultaneously, and while the stock is in motion, and flattening and piercing the stock and severing blanks therefrom while stationary.

HENRY J. HOGUE.